(12) United States Patent
Walters

(10) Patent No.: US 10,402,409 B2
(45) Date of Patent: Sep. 3, 2019

(54) METHOD FOR RANKING SOCIAL AND SEARCH WEB TRAFFIC WITH VIRALITY SCORES

(71) Applicant: Yahoo! Inc., Sunnyvale, CA (US)

(72) Inventor: Joshua Walters, Irvine, CA (US)

(73) Assignee: Excalibur IP, LLC, New York, NY (US)

( * ) Notice: Subject to any disclaimer, the term of this patent is extended or adjusted under 35 U.S.C. 154(b) by 383 days.

(21) Appl. No.: 14/566,572

(22) Filed: Dec. 10, 2014

(65) Prior Publication Data

US 2016/0170990 A1  Jun. 16, 2016

(51) Int. Cl.
*G06F 16/00* (2019.01)
*G06F 16/2457* (2019.01)
*H04L 29/08* (2006.01)
*G06F 16/248* (2019.01)

(52) U.S. Cl.
CPC ...... *G06F 16/24578* (2019.01); *G06F 16/248* (2019.01); *H04L 67/02* (2013.01)

(58) Field of Classification Search
CPC .................................................. G06F 17/3053
See application file for complete search history.

(56) References Cited

U.S. PATENT DOCUMENTS

| | | | | |
|---|---|---|---|---|
| 7,475,346 B1* | 1/2009 | Bullock | ............. | G06F 17/3089 709/203 |
| 2009/0144392 A1* | 6/2009 | Wang | ............. | G06Q 10/10 709/217 |
| 2012/0324008 A1* | 12/2012 | Werz, III | ............. | G06Q 30/02 709/204 |
| 2014/0237093 A1* | 8/2014 | Hofman | ............. | G06F 17/30861 709/223 |
| 2014/0344281 A1 | 11/2014 | Rao et al. | | |

FOREIGN PATENT DOCUMENTS

CA   2708415 A1 * 12/2011 .......... G06F 11/3438

* cited by examiner

*Primary Examiner* — Etienne P Leroux
*Assistant Examiner* — Farhad Agharahimi
(74) *Attorney, Agent, or Firm* — Weaver Austin Villeneuve & Sampson LLP

(57) ABSTRACT

In one embodiment, for each one of a plurality of web pages, a number of instances of page events for the one of the plurality of web pages and a number of instances of a particular subset of the page events for the one of the plurality of web pages may be ascertained and based upon the number of instances of page events for the one of the plurality of web pages and the number of instances of the particular subset of the page events for the one of the plurality of web pages, a virality score for the one of the plurality of web pages may be determined. The virality score may be determined independent from numbers of instances of page events associated with other web pages. The plurality of web pages may be ranked based upon the virality scores associated with the plurality of web pages.

22 Claims, 6 Drawing Sheets

| Web page URL 202 | Total number of instances of page events 204 | Number of instances of page events associated with social traffic 206 | Number of instances of web page events associated with search traffic 208 |
|---|---|---|---|
| URL 1 | 1034 | 500 | 534 |
| URL 2 | 30008 | 20006 | 10002 |
| URL 3 | 2509 | 2000 | 509 |

FIG. 2

METHOD FOR RANKING SOCIAL AND SEARCH WEB TRAFFIC WITH VIRALITY SCORES

BACKGROUND OF THE INVENTION

The disclosed embodiments relate generally to computer-implemented methods and apparatus for ranking web pages.

A number of resources are available for identifying the most visited web sites on the Internet. Often, web sites are ranked to determine their popularity simply according to the number of visits to the web sites. However, this ranking cannot identify those web pages that are trending.

Trending web pages may also be referred to as viral web pages. A viral web page is a web page that has experienced exponential growth in traffic in a short period of time. A viral web page is often shared by word-of-mouth or social web sites such as Facebook and Twitter. Unfortunately, it is difficult to identify viral web pages or rank web pages according to virality with sufficient accuracy.

SUMMARY OF THE INVENTION

In one embodiment, for each one of a plurality of web pages, a number of instances of page events for the one of the plurality of web pages and a number of instances of a particular subset of the page events for the one of the plurality of web pages may be ascertained and based upon the number of instances of page events for the one of the plurality of web pages and the number of instances of the particular subset of the page events for the one of the plurality of web pages, a virality score for the one of the plurality of web pages may be determined. The virality score may be determined independent from numbers of instances of page events associated with other web pages. The plurality of web pages may be ranked based upon the virality scores associated with the plurality of web pages.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 2 is a diagram illustrating an example log that may be maintained in accordance with various embodiments.

DETAILED DESCRIPTION OF THE SPECIFIC EMBODIMENTS

Figure 1:
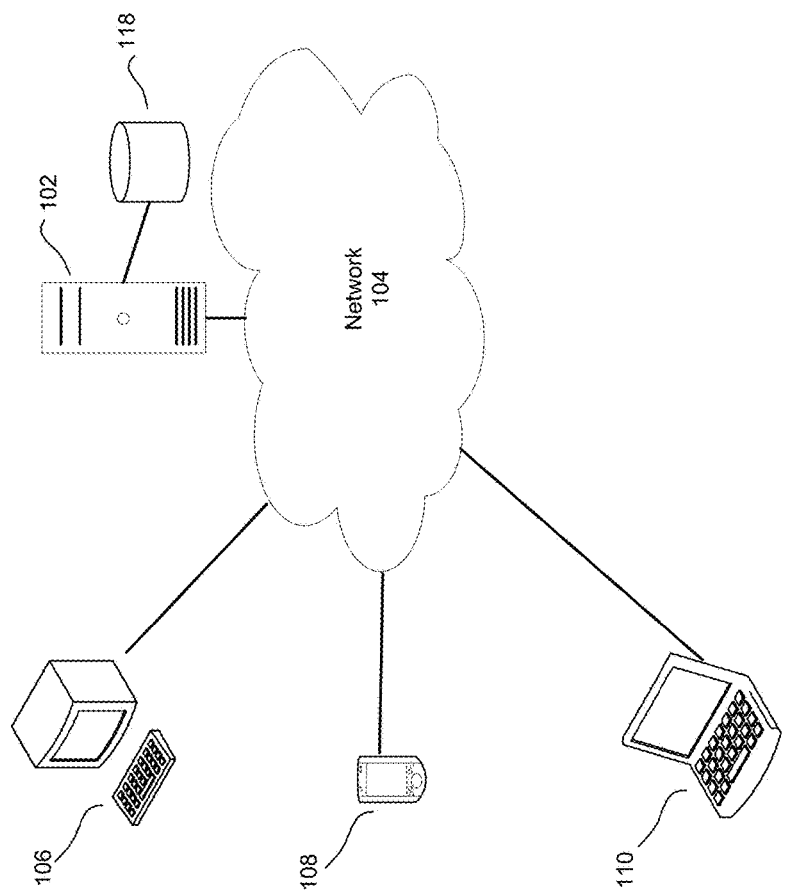
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. Often, users rely on the Internet to search for information of interest to them. In addition, many applications facilitate the retrieval of information.

Information is often presented to a user in the form of a document. A document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

Where web pages increase in popularity gradually over time, it is possible to predict the popularity of the web pages over time. However, the popularity of viral web pages typically increases exponentially in a very short period of time. As a result, it is difficult to predict the popularity of viral web pages.

The disclosed embodiments support the ranking of web pages according to the virality of the web pages. Once ranked, a list, graph, or other visual representation identifying at least a portion of the ranked web pages may be presented. Alternatively, a top-ranked subset of the ranked web pages may be recommended and/or advertisements may be presented via the top-ranked subset of the ranked web pages.

Example System

FIG. 1 is a diagram illustrating an example system in which various embodiments may be implemented. As shown in FIG. 1, the system may include one or more servers 102 associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, the server(s) 102 may include a web server, search server, and/or content server.

A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on web sites, in applications, or other places where users are more likely to see them, such as during an online session.

Service providers have rapidly expanded into many areas that allow users to interact with various resources and other users in a multitude of ways. For example, users may store and share photographs and video through a dedicated photo sharing web property. In another brief example, users may obtain and share news on a dedicated news related web property.

In accordance with various embodiments, a plurality of web properties may be accessed via a web portal. Each web property may include a plurality of web pages. Example web properties include Mail, News, Sports, Finance, Weather, Autos, Homes, Dating, Jobs, Shopping, Parenting, Health, Style, Beauty, Food, Movies, Travel, Answers, Careers, Celebrity, Fantasy Baseball, Fantasy Football, Fantasy Sports, Flickr, Games, Groups, Horoscopes, Local, Maps, Messenger, Music, Search, Small Business, Tech, and TV.

Many web-based advertisements are placed by a web publisher on a "per-property" basis, such as different web properties that are unified by a web portal. For example, a decision whether to place an advertisement on a particular web page may be based on whether a user is viewing a web page that is an "e-mail" page, a "finance" page, a "portal front page," etc.

A plurality of clients 106, 108, 110 may access a web service on a web server via a network 104. For example, the clients 106, 108, 110 may view web pages of the web site. More particularly, the clients 106, 108, 110 may access web pages of a web property via a web portal associated with the web server.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed embodiments enable a plurality of web pages to be ranked based, at least in part, upon their virality. Once ranked, a list, graph, or other pictorial representation identifying at least a portion of the ranked web pages may be provided. Moreover, one or more of the plurality of web pages may be recommended or presented. In some embodiments, an advertisement pertaining to a product or service may be presented in conjunction with one of the web pages.

An advertisement may include text, one or more images, video, and/or audio. An advertisement may also include one or more hypertext links, enabling a user to proceed with the purchase of a particular product or service via the Internet.

The advertisement (or portion thereof) may be presented within a web page. Alternatively, the advertisement may be presented external to a web page. For example, the advertisement may be presented via a pop-up advertisement.

Embodiments disclosed herein may be implemented via the server(s) 102 and/or the clients 106, 108, 110. For example, various features may be implemented via a web browser and/or application on the clients 106, 108, 110. The disclosed embodiments may be implemented via software and/or hardware.

Selection of an advertisement may be performed based, at least in part, upon content of the web page or a web property associated with the web page. In addition, an advertisement may be selected further based upon a browsing context. The browsing context may include geographic information such as a location from which the user is browsing. In addition, the browsing context may include or be derived from information from a user profile.

A variety of mechanisms may be implemented to support the generation of user profiles including, but not limited to, collecting or mining navigation history, stored documents, tags, or annotations, to provide a few examples.

Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

In accordance with various embodiments, a log of page events may be maintained. FIG. 2 is a diagram illustrating an example log in which web page events may be recorded in accordance with various embodiments. In this example, the log includes a plurality of entries, where each of the entries corresponds to a different one of a plurality of web pages. Each of the entries may identify a corresponding web page URL 202 of one of the plurality of web pages and indicate a total number of instances of page events 204 for the corresponding web page. The total number of instances of web page events may indicate the total number of instances that the web page is viewed or otherwise accessed. In addition, it may be desirable to identify one or more subset(s) of traffic via which the web page is accessed. Thus, each of the entries may further indicate a number of instances of page events associated with one or more subsets of traffic via which the web page is accessed. A subset of traffic via which a web page is accessed may be referred to as a type of traffic. More particularly, a type of traffic may be identified as being received from a web site of a set of one or more web sites. The type of traffic may be one of two or more possible types of web traffic. Example types of traffic include social traffic and search traffic. For example, each of the entries may indicate a number of instances of page events associated with social traffic 206 and/or a number of instances of page events associated with search traffic 208. In some embodiments, a value of the referrer field may also be recorded in the log, enabling traffic originating from a specific web site to be identified. The log may be maintained in one or more tables or other suitable data structures.

Upon receiving a Hypertext Transfer Protocol (HTTP) request requesting access to one of the plurality of web pages, a server associated with the web site may ascertain a type of traffic based upon a referrer field of the HTTP request. More particularly, the referrer field may indicate that the type of traffic is social traffic or search traffic. For example, if the referrer field indicates that the HTTP request originated from a social web site such as Facebook, Twitter, LinkedIn, Reddit, or Blogger, the type of traffic may be identified as social traffic. As another example, if the referrer field indicates that the HTTP request originated from a search web site such as Google, Yahoo, or Bing, the type of traffic may be identified as search traffic. The server may then record an instance of a page event of the ascertained type of traffic for the web page in the log of page events. More particularly, the total number of instances of page events 204 may be incremented for the web page, while either the number of instances of page events associated with social traffic 206 or the number of instances of page events associated with search traffic 208 may also be incremented.

Figure 3:
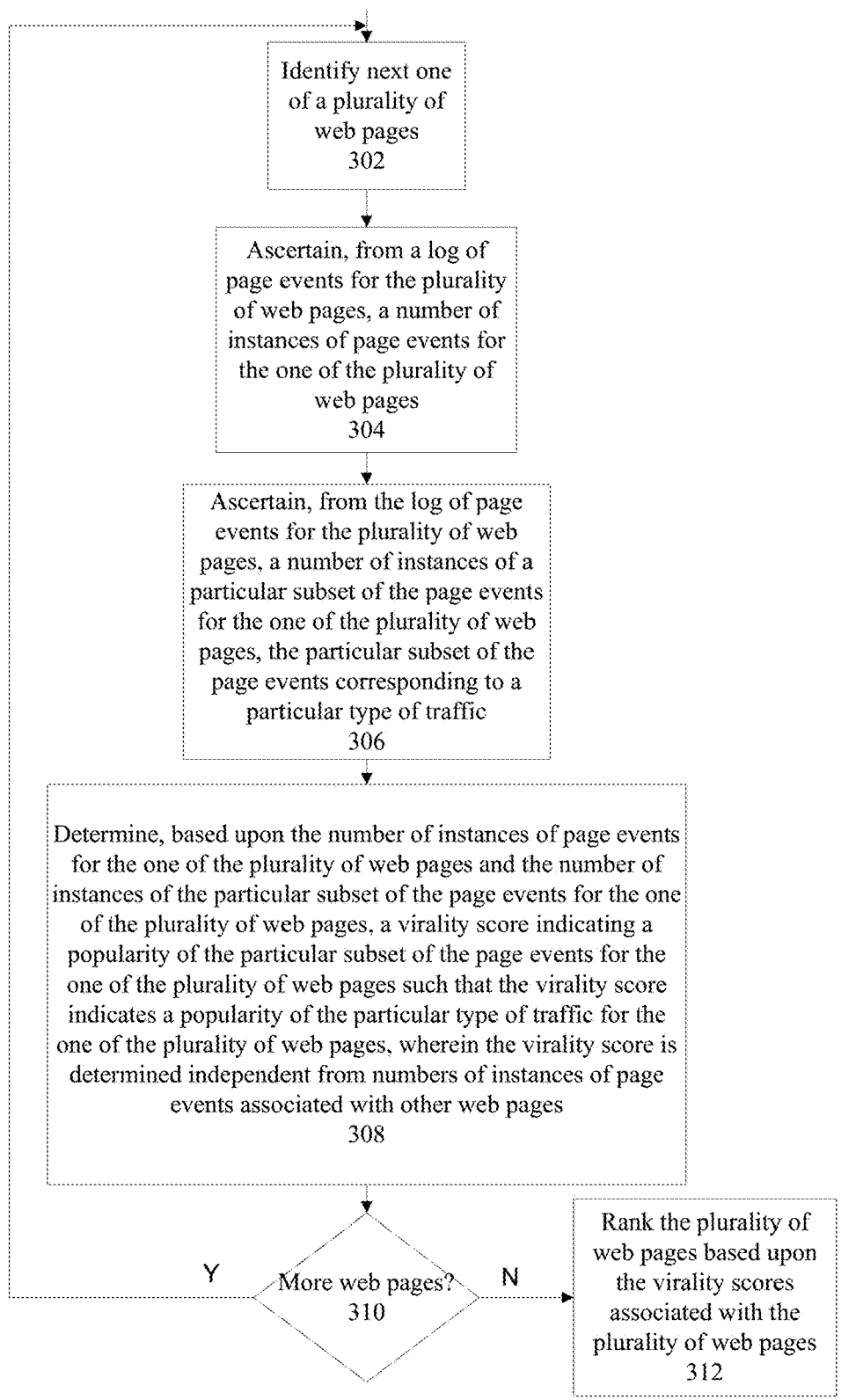
FIG. 3 is a process flow diagram illustrating an example method of ranking web pages in accordance with various embodiments.

FIG. 3 is a process flow diagram illustrating an example method of ranking web pages in accordance with various embodiments. A virality score may be determined for each one of a plurality of web pages, as shown at 302-310. More particularly, a next one of the plurality of web pages may be identified at 302. A total number of instances of page events for the one of the plurality of web pages may be ascertained at 304 from a log of page events for the plurality of web pages such as that described above with reference to FIG. 2. For example, an entry (e.g., row) in the log of page events may be ascertained, where the entry corresponds to the identified web page. The total number of instances of page events for the web page may then be ascertained from the entry. In addition, a number of instances of a particular subset of the page events for the one of the plurality of web pages may be ascertained at 306 from the log of page events for the plurality of web pages. For example, the number of instances of the particular subset of page events for the web page may be ascertained from the entry corresponding to the web page.

The particular subset of the page events may correspond to a particular type of traffic. In accordance with various embodiments, the type of traffic may be search traffic or social traffic. More particularly, search traffic may be identified as being received from one of a first set of one or more web sites, while social traffic may be identified as being received from one of a second set of one or more web sites. The virality score associated with search traffic may be referred to as a search index, while the virality score associated with social traffic may be referred to as a social index.

The plurality of web pages may be associated with a particular category of web pages. For example, the plurality of web pages may be accessible via a web portal, and the particular category of web pages may correspond to one of a plurality of web properties accessible via the web portal.

Based upon the number of instances of page events for the one of the plurality of web pages and the number of instances of the particular subset of the page events for the one of the plurality of web pages, a virality score indicating a popularity of the particular subset of the page events for the one of the plurality of web pages may be determined at 308 such that the virality score indicates a popularity of the particular type of traffic for the one of the plurality of web pages. For example, the virality score may indicate the popularity of a web page for users accessing the web page from social web sites or search web sites.

Existing analytics often skew results to high values for pages having low web traffic. As a result, those web pages that are identified as having high virality scores are often not as popular as the virality scores imply.

In accordance with various embodiments, the virality score may be determined independent from numbers of instances of page events associated with other web pages. Stated another way, the virality score associated with a web page may be determined in isolation without obtaining numbers of page events associated with other web pages—even if those other web pages are within the same web property. In other words, the virality score associated with a web page may be determined without performing a calculation using numbers of page events associated with other web pages.

In one embodiment, the virality score may be calculated according to the equation:

$$\log\_10(((|x|^2)/|y|)+1),$$

where y=the number of instances of page events for the particular one of the plurality of web pages, and x=the number of instances of a particular subset of the page events for the particular one of the plurality of web pages.

As indicated above, y represents all page events (e.g., views) for a given web page, while x represents a subset of y. As can be seen from this example, the calculation performed to determine the virality score associated with a given web page is fairly inexpensive computationally. In addition, where low web traffic is reflected by a low number of instances of page events, y, the resulting virality score will not be skewed to indicate that the web page is popular where the subset of page events represented by x is relatively large. In other words, those web pages having relatively large virality scores according to the above-referenced equation will generally also have relatively high web traffic. Accordingly, the above-discussed embodiment provides advantages over other mechanisms for calculating virality scores for web pages.

If there are more web pages at 310, the process repeats at 302 to determine a virality score for the remaining web pages. Upon determining that there are no further web pages for which a virality score is to be determined, the plurality of web pages may be ranked at 312 based upon the virality scores associated with the plurality of web pages.

In some embodiments, the ranked web pages may be categorized according to their corresponding virality scores. For example, web pages having virality scores within a range of virality scores 0-5 may be identified as unpopular, web pages having virality scores within a range of virality scores 6-10 may be identified as having average popularity, and web pages having viralitly scores within a range of virality scores 11-15 may be identified as popular.

Once the plurality of web pages are ranked, one or more top ranked web pages may be identified from the ranked plurality of web pages (or corresponding categories). In some instances, the top ranked web pages may be identified based, at least in part, upon further criteria, such as web property or content-based criteria. A list of the identified top ranked web pages may then be provided to a client. Such a list may be presented in text form or graphically.

In accordance with various embodiments, a graph or other pictorial representation may depict the popularity of at least a portion of the plurality of web pages according to their corresponding virality scores. For example, the graph may implement different types of shapes, lines, or dots, as well as different colors, to indicate the differences in popularity of the web sites.

The list, graph, or other pictorial representation may indicate that identified top web sites are "trending now" or otherwise popular. For example, top trending web pages may be promoted by presenting the list of top trending web pages via a homepage or posting the list on Twitter. As another example, the list, graph, or other pictorial representation may be presented in response to a query received from a client.

In addition, advertising inventory may be allocated to the identified top ranked web pages. More particularly, once a top ranked web page is identified, it is possible to determine the characteristics (e.g., demographics) of users who are most likely to view the web page. A suitable advertisement may then be allocated to the web page based, at least in part, upon the characteristics of users who are most likely to view the web page and/or target user profiles specified by advertisers in association with advertisements. By allocating a significant portion of advertising inventory to web page(s) that are determined to be trending, it is possible to maximize the impact of those advertisements.

In some instances, advertisers may prefer that their advertisements be presented via a web page associated with a particular web property. As a result, each one of the plurality of web properties may have a set of advertisements associated therewith. Upon ranking the plurality of web pages associated with the particular web property, it is possible to identify a viral web page of the web property via which to present at least one of the advertisements associated with the web property.

The virality score associated with a web page may differ depending upon the type of traffic associated with the subset of page events for the web page. For example, the virality score associated with a web page may differ according to whether the virality score is associated with traffic originating from social web sites or search web sites.

In some embodiments, the source of the traffic may be useful in determining the amount of advertising inventory to allocate to the web page. In addition, the source of the traffic may be useful in selecting an advertisement to present in association with the web page. Moreover, the source of the traffic may be useful in selecting a suitable medium via which to present an advertisement or list of web sites to a client. For example, where the traffic originates from social web sites, the advertisement or list of recommended web sites may be transmitted via Twitter. As another example, where the traffic originates from search web sites, the advertisement, list of recommended web sites, or graphical representation representing popularity of web sites may be presented via a home page of a search web site.

Although the above-described embodiments pertain to subsets of traffic including search traffic and social traffic, it is important to note that these examples are merely illustrative. Thus, virality scores associated with other subsets of traffic may also be ascertained in accordance with the disclosed embodiments. For example, virality scores associated with traffic originating from a specific web site may be determined.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
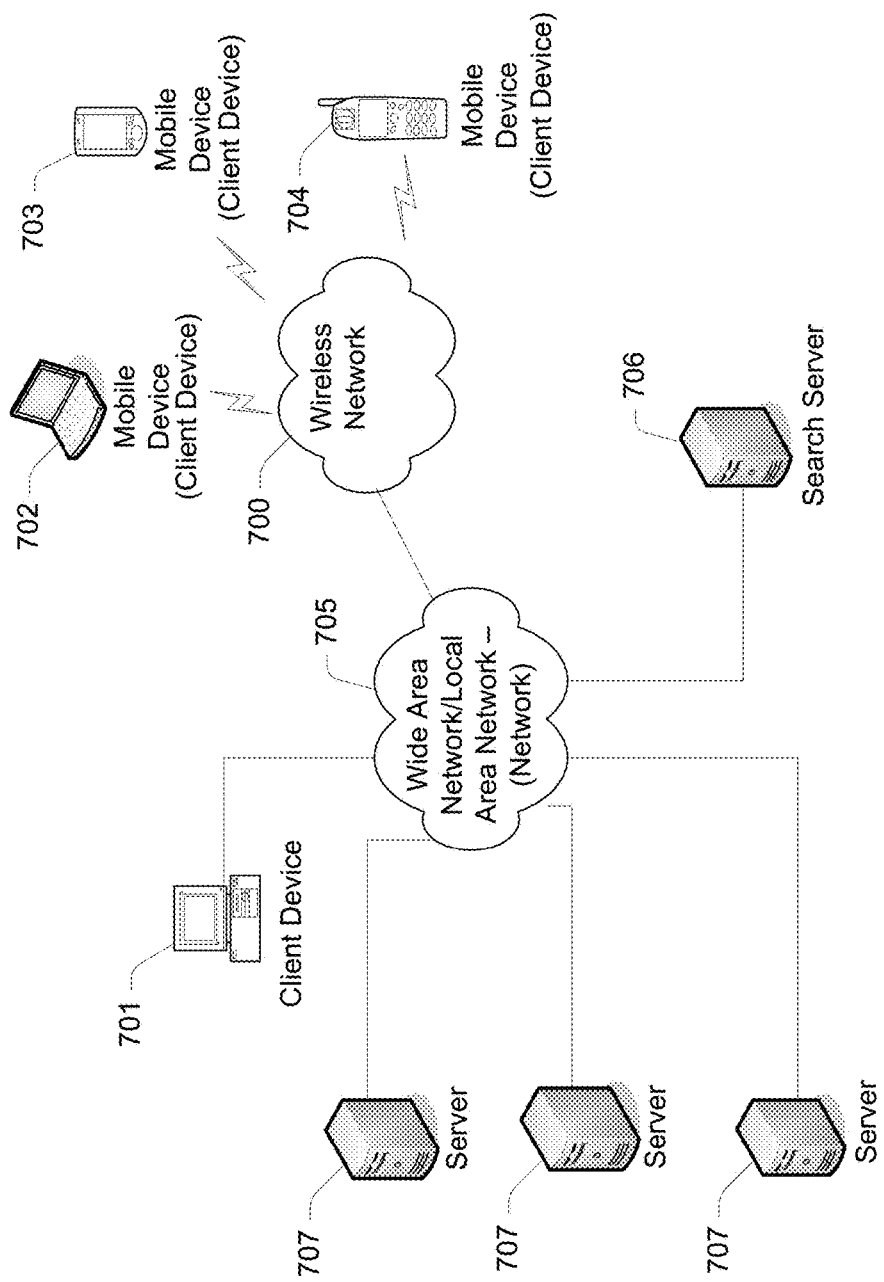
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

Figure 5:
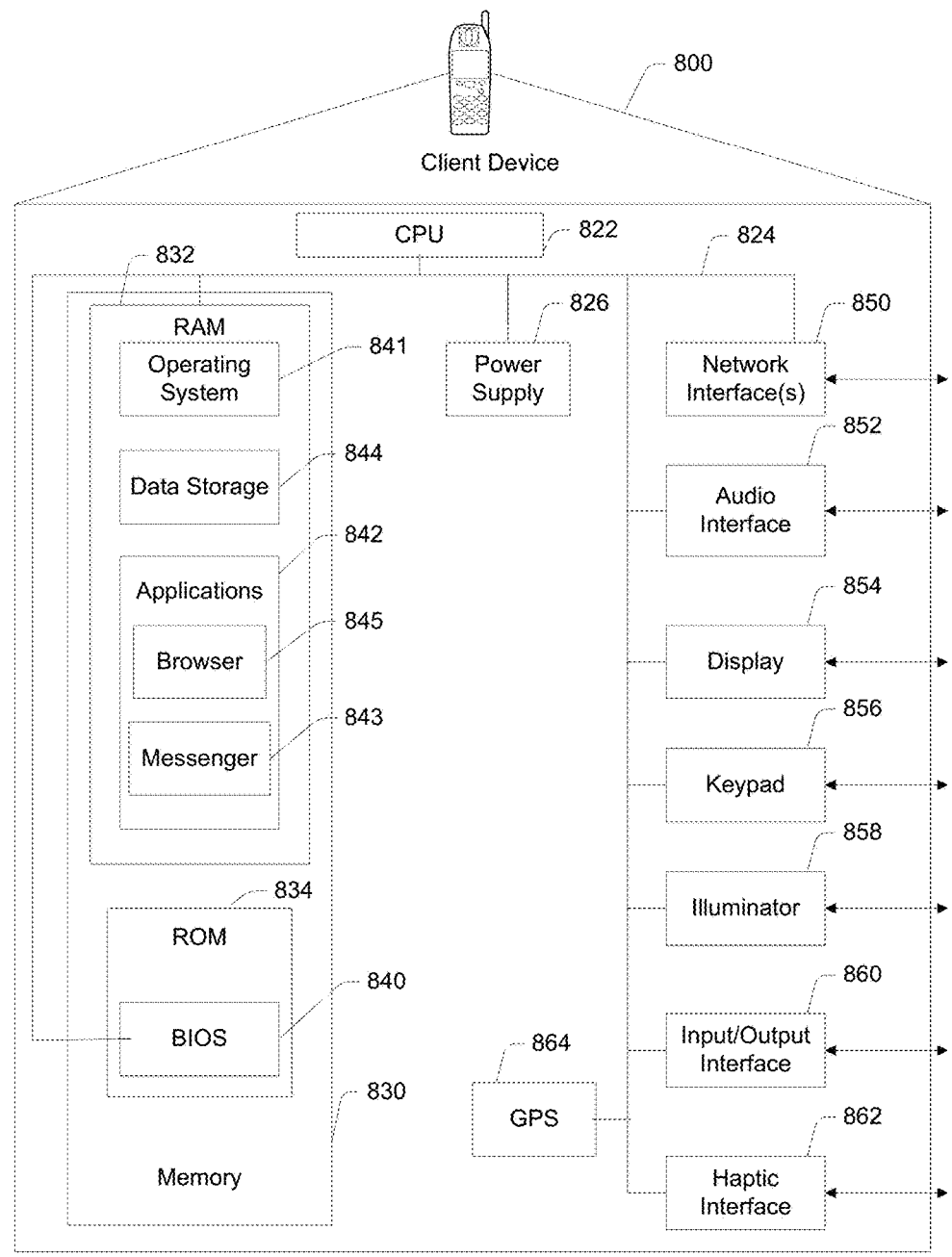
FIG. 5 is a schematic diagram illustrating an example client device in which various embodiments may be implemented.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 6:
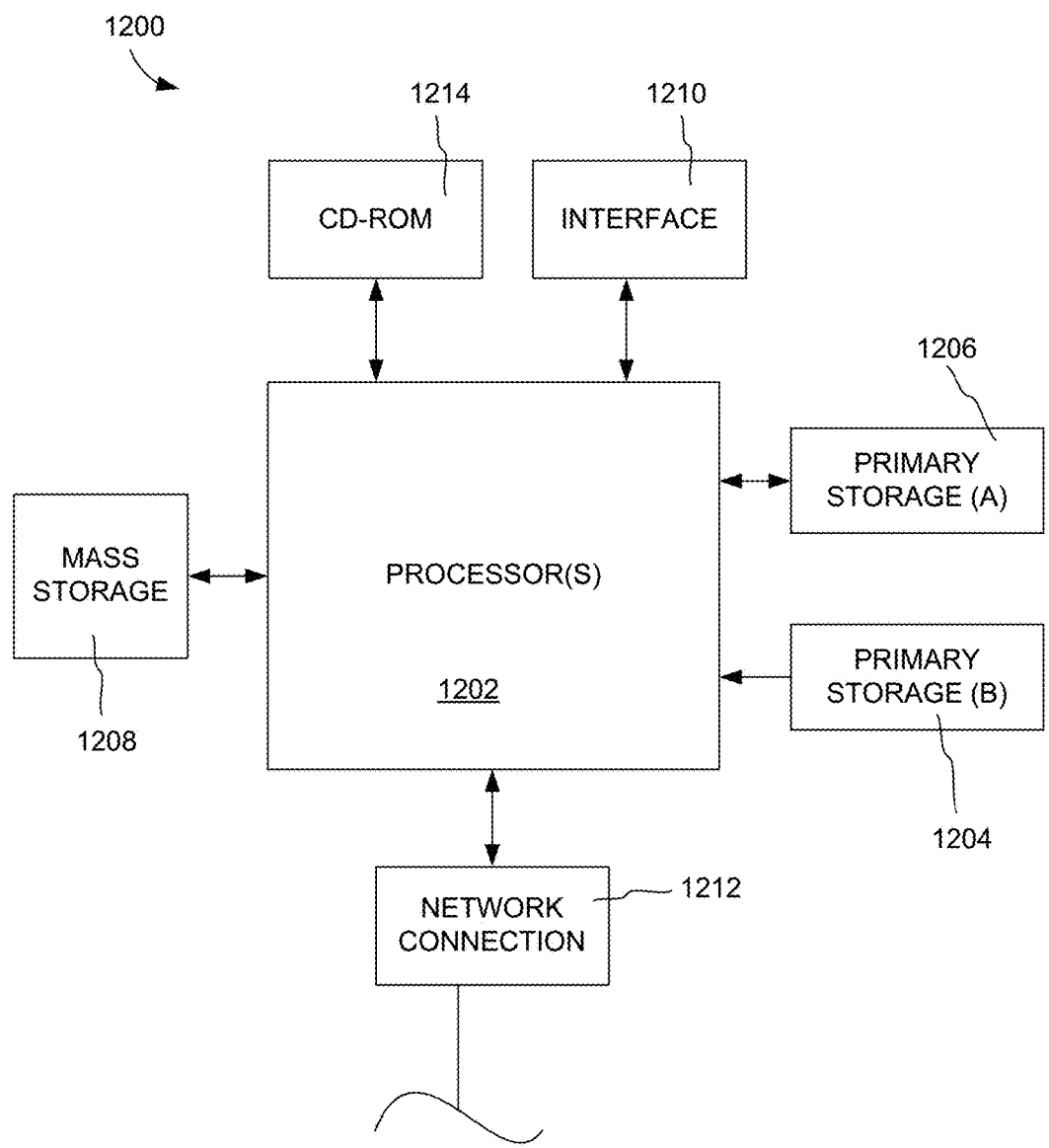
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   for each one of a plurality of web pages:
      ascertaining, from a log of page events for the plurality of web pages, a number of instances that the one of the plurality of web pages was accessed;
      ascertaining, from the log of page events for the plurality of web pages, a number of instances of a particular subset of the instances that the one of the plurality of web pages was accessed, the particular subset of the instances that the one of the plurality of pages was accessed corresponding to a particular type of traffic referred to the one of the plurality of web pages, the particular type of traffic originating from a set of web sites corresponding to the particular type of traffic, the particular type of traffic being one of two or more types of traffic, each of the types of traffic originating from a different set of web sites; and
      determining, based upon the number of instances that the one of the plurality of web pages was accessed and the number of instances of the particular subset of the instances that the one of the plurality of web pages was accessed, a virality score indicating a popularity of the particular type of traffic for the one of the plurality of web pages, wherein the virality score is determined independent from numbers of instances that other web pages have been accessed; and ranking the plurality of web pages based upon the virality scores associated with the plurality of web pages.

2. The method as recited in claim 1, wherein determining the virality score comprises:
calculating the virality score according to the equation $\log\_10(((|x|^2)/|y|)+1)$,
wherein y=the number of instances that the particular one of the plurality of web pages has been accessed,
x=the number of instances of the particular subset of the instances that the one of the plurality of web pages was accessed.

3. The method as recited in claim 1, further comprising:
receiving a Hypertext Transfer Protocol (HTTP) request requesting access to the one of the plurality of web pages;
ascertaining a type of traffic based upon a referrer field of the HTTP request; and
recording, in the log of page events, an instance of the ascertained type of traffic for the one of the plurality of web pages.

4. The method as recited in claim 1, wherein 1) the particular type of traffic is social traffic and the set of web sites consists of social web sites or 2) the particular type of traffic is search traffic and the set of web sites consists of search web sites.

5. The method as recited in claim 1, further comprising:
identifying one or more top ranked web pages from the ranked plurality of web pages; and
providing a list of the identified top ranked web pages.

6. The method as recited in claim 5, further comprising:
presenting content via the identified top ranked web pages.

7. The method as recited in claim 1, wherein the plurality of web pages are accessible via a web portal, and wherein the plurality of web pages correspond to a single one of a plurality of web properties accessible via the web portal.

8. The method as recited in claim 1, wherein determining the virality score comprises calculating a logarithm of an operand, the operand being calculated based upon the number of instances that the one of the plurality of web pages was accessed and the number of instances of the particular subset of the instances that the one of the plurality of web pages was accessed.

9. The method as recited in claim 6, further comprising:
selecting the content based, at least in part, on the particular type of traffic.

10. The method as recited in claim 4, the two or more types of traffic including social traffic and search traffic.

11. The method as recited in claim 1, the number of instances that the one of the plurality of web pages was accessed corresponding to the two or more types of traffic.

12. A system, comprising:
a processor; and
a memory, at least one of the processor or the memory being configured to:
for each one of a plurality of web pages:
ascertain, from a log of page events for the plurality of web pages, a number of instances that the one of the plurality of web pages was accessed;
ascertain, from the log of page events for the plurality of web pages, a number of instances of a particular subset of the instances that the one of the plurality of web pages was accessed, the particular subset of the instances that the one of plurality of pages was accessed corresponding to a particular type of traffic referred to the one of the plurality of web pages, the particular type of traffic originating from a set of web sites corresponding to the particular type of traffic, the particular type of traffic being one of two or more types of traffic, each of the types of traffic originating from a different set of web sites; and
determine, based upon the number of instances that the one of the plurality of web pages was accessed and the number of instances of the particular subset of the instances that the one of the plurality of web pages was accessed, a virality score indicating a popularity of the particular type of traffic for the one of the plurality of web pages, wherein the virality score is determined independent from numbers of instances that other web pages have been accessed; and
rank the plurality of web pages based upon the virality scores associated with the plurality of web pages.

13. The system as recited in claim 12, wherein determining the virality score comprises:
calculating the virality score according to the equation $\log\_10(((|x|^2)/|y|)+1)$,
wherein y=the number of instances that the particular one of the plurality of web pages was accessed,
x=the number of instances of the particular subset of the instances that the one of the plurality of web pages was accessed.

14. The system as recited in claim 12, at least one of the processor or the memory being configured to:
receive a Hypertext Transfer Protocol (HTTP) request requesting access to the one of the plurality of web pages;
ascertain a type of traffic based upon a referrer field of the HTTP request; and
record, in the log of page events, an instance of the ascertained type of traffic for the one of the plurality of web pages.

15. The system as recited in claim 12, wherein the particular type of traffic includes 1) social traffic and the set of web sites consists of social web sites or 2) search traffic and the set of web sites consists of search web sites.

16. The system as recited in claim 12, at least one of the processor or the memory being configured to:
identify one or more top ranked web pages from the ranked plurality of web pages; and
provide a list of the identified top ranked web pages.

17. The system as recited in claim 12, wherein the plurality of web pages are accessible via a web portal, and wherein the plurality of web pages correspond to a single one of a plurality of web properties accessible via the web portal.

18. A non-transitory computer-readable storage medium storing thereon computer-readable instructions for performing operations, comprising:
for each one of a plurality of web pages:
ascertaining, from a log of page events for the plurality of web pages, a number of instances that the one of the plurality of web pages was accessed;
ascertaining, from the log of page events for the plurality of web pages, a number of instances of a particular subset of the instances that the one of the plurality of web pages was accessed, the particular subset of the instances that the one of the plurality of pages was accessed corresponding to a particular type of traffic referred to the one of the plurality of web pages, the particular type of traffic originating from a set of web sites corresponding to the particular type of traffic, the particular type of traffic being one of two or more types of traffic, each of the types of traffic originating from a different set of web sites; and determining, based upon the number of instances that the one of the plurality of web pages was accessed and the number of instances of the particular subset of the instances that the one of the plurality of web pages was accessed, a virality score indicating a popularity of the particular type of traffic for the one of the plurality of web pages, wherein the virality score is determined independent from numbers of instances that other web pages have been accessed; and ranking the plurality of web pages based upon the virality scores associated with the plurality of web pages.

19. The non-transitory computer-readable storage medium as recited in claim 18, wherein determining the virality score comprises:

calculating the virality score according to the equation $\log\_10(((|x|^2)/|y|)+1)$, wherein y=the number of instances that the particular one of the plurality of web pages was accessed, x=the number of instances of the particular subset of the instances that the one of the plurality of web pages was accessed.

20. The non-transitory computer-readable storage medium as recited in claim 18, further comprising:

identifying one or more top ranked web pages from the ranked plurality of web pages; and providing a list of the identified top ranked web pages.

21. The non-transitory computer-readable storage medium as recited in claim 18, wherein the plurality of web pages are accessible via a web portal, and wherein the plurality of web pages correspond to a single one of a plurality of web properties accessible via the web portal.

22. The non-transitory computer-readable storage medium as recited in claim 18, further comprising:

receiving a Hypertext Transfer Protocol (HTTP) request requesting access to the one of the plurality of web pages;

ascertaining a type of traffic based upon a referrer field of the HTTP request; and recording, in the log of page events, an instance of the ascertained type of traffic for the one of the plurality of web pages.

\* \* \* \* \*